(12) United States Patent
Yoshitomi et al.

(10) Patent No.: US 7,112,549 B2
(45) Date of Patent: Sep. 26, 2006

(54) LOW THERMAL EXPANSION CERAMIC AND MEMBER FOR EXPOSURE SYSTEM

(75) Inventors: Yasuki Yoshitomi, Higashiosaka (JP); Tadahisa Arahori, Ashiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 320 days.

(21) Appl. No.: 10/257,027

(22) PCT Filed: Sep. 20, 2001

(86) PCT No.: PCT/JP01/08198

§ 371 (c)(1),
(2), (4) Date: Oct. 8, 2002

(87) PCT Pub. No.: WO02/24600

PCT Pub. Date: Mar. 28, 2002

(65) Prior Publication Data

US 2003/0100434 A1 May 29, 2003

(30) Foreign Application Priority Data

Sep. 20, 2000 (JP) ............................. 2000-284873
Jan. 24, 2001 (JP) ............................. 2001-15409

(51) Int. Cl.
*H01B 1/14* (2006.01)
*C04B 35/19* (2006.01)
*C04B 35/195* (2006.01)

(52) U.S. Cl. ..................... 501/128; 501/87; 501/89; 501/90; 501/96.1; 501/96.3; 501/97.4; 501/100; 252/502; 252/504; 252/516; 252/518.1; 252/521.3

(58) Field of Classification Search ............ 501/88–90, 501/99–101, 87, 96.1, 96.3, 97.1, 97.3, 97.4, 501/128; 252/502, 504, 507, 516, 518.1, 252/521.3
See application file for complete search history.

(56) References Cited

U.S. PATENT DOCUMENTS

| | | | | |
|---|---|---|---|---|
| 4,098,725 A | * | 7/1978 | Yamamoto et al. .... | 252/520.21 |
| 4,855,259 A | * | 8/1989 | Claussen et al. ............ | 264/646 |
| 5,023,215 A | * | 6/1991 | Cleveland .................. | 501/97.4 |
| 6,953,538 B1 | * | 10/2005 | Takahashi et al. ....... | 252/518.1 |
| 2003/0139280 A1 | * | 7/2003 | Takahashi et al. .......... | 501/128 |

FOREIGN PATENT DOCUMENTS

EP        1298104        *   5/2003

(Continued)

OTHER PUBLICATIONS

Translation of Japanese document 58-26075, Feb. 1983.*

*Primary Examiner*—Karl Group
(74) *Attorney, Agent, or Firm*—Barnes & Thornburg LLP

(57) ABSTRACT

A low-thermal-expansion, rigid and wear-resistant ceramic is provided. The low-thermal-expansion ceramic of the invention includes 60 vol % to 99.9 vol % of at least one selected from the group consisting of cordierite, spodumene and eucryptite and 0.1 vol % to 40 vol % of at least one selected from the group consisting of carbides, nitrides, borides and silicides of group IVa elements, group Va elements and group VIa elements, and boron carbide. The ceramic has a porosity of 0.5% or less and a thermal expansion coefficient, at 10° C. to 40° C., of $1.5 \times 10^{-6}$/° C. or less.

11 Claims, 2 Drawing Sheets

FOREIGN PATENT DOCUMENTS

| | | | |
|---|---|---|---|
| JP | 58-15081 | * | 1/1983 |
| JP | 58-26075 | * | 2/1983 |
| JP | 9-283401 | * | 11/1992 |
| JP | 4-323850 | * | 10/1997 |
| JP | 11-079830 | * | 3/1999 |
| JP | 11209171 | | 8/1999 |
| JP | 11-343168 | * | 12/1999 |
| JP | 2000-219572 | * | 8/2000 |

* cited by examiner

LOW THERMAL EXPANSION CERAMIC AND MEMBER FOR EXPOSURE SYSTEM

TECHNICAL FIELD

The present invention relates to low-thermal-expansion ceramics and members of an exposure apparatus that use the low-thermal-expansion ceramics. The present invention particularly relates to a dense and low-thermal-expansion ceramic made chiefly of cordierite, spodumene or eucryptite and having an excellent wear resistance and, to a member at least partially formed of such a ceramic, in particular, a member of an exposure apparatus used for performing an exposure process on a semiconductor wafer or liquid-crystal glass substrate in manufacturing a semiconductor integrated circuit or liquid-crystal integrated circuit for example. Here, examples of the member include such a jig as vacuum chuck, stage and stage-position metering mirror.

BACKGROUND ART

With the increased packing density of LSI for example, the circuit scale has remarkably been reduced. With regard to a semiconductor device, the line width thereof has been reduced to less than 0.1 μm. Accordingly, there is a growing demand through the years for the accuracy of an exposure apparatus employed for fabricating such a circuit or device. Thus, low-thermal-expansion-coefficient members have been developed for use in the exposure apparatus.

For example, Japanese Patent Laying-Open No. 11-209171 discloses a dense and low-thermal-expansion ceramic and a member of a semiconductor manufacturing apparatus that is formed of the dense and low-thermal-expansion ceramic. The dense and low-thermal-expansion ceramic contains at least 80% by weight of cordierite and a rare-earth element equivalent to 1–20% by weight of oxide, the ceramic having a porosity of 0.1% or less and a thermal expansion coefficient of $1 \times 10^{-6}/°$ C. or less at 10–40° C.

Japanese Patent Laying-Open No. 11-343168 discloses a low-thermal-expansion black ceramic further having a light-shielding property that contains at least 80% by weight of cordierite and preferably contains a rare-earth element equivalent to 1–20% by weight of oxide, the ceramic having a porosity of 0.5% or less, a carbon content of 0.1–2.0% by weight, and a thermal expansion coefficient of $1 \times 10^{-6}/°$ C. or less at 10–40° C. There is also disclosed a member of a semiconductor manufacturing apparatus that is formed of such a dense and low-thermal-expansion ceramic.

The remarkably reduced scale of the circuit requires the exposure accuracy to be maintained for its semiconductor or liquid-crystal glass substrate. Then, for example, a material for a vacuum chuck or stage-position metering mirror of an exposure apparatus must have a low coefficient of thermal expansion as well as high rigidity (Young's modulus). Quartz, aluminum titanate and crystallized glass are examples of conventional low-thermal-expansion materials that have a problem in terms of rigidity.

On the other hand, conventional dense cordierite materials or low-thermal-expansion ceramics disclosed in Japanese Patent Laying-Open Nos. 11-209171 and 11-343168 have a low coefficient of thermal expansion as well as high rigidity.

However, most of such low-thermal-expansion ceramics including the dense cordierite materials have a relatively low wear resistance. When such a conventional low-thermal-expansion ceramic is used in a wafer-holding vacuum chuck of an exposure apparatus, for example, the wafer-holding surface of the chuck that contacts the wafer wears and loses its flatness, and consequently an exposure failure is likely to occur. If the conventional low-thermal-expansion ceramic is used in a stage-position metering mirror, movement of the stage causes wear which highly possibly results in an exposure failure.

In addition, most of the conventional low-thermal-expansion ceramics have electrical insulation property. Accordingly, if such a ceramic is used in the wafer-holding vacuum chuck of an exposure apparatus, static electricity generated, when a wafer is placed on the chuck, cannot be removed and consequently particles are attached to the wafer, resulting in an exposure failure. This problem regarding particles becomes serious as the circuit scale is increasingly reduced. Therefore, a low-resistance ceramic material is desirably used in the vacuum chuck in order to remove the static electricity.

Moreover, in terms of visibility and soil resistance, a ceramic member used for a semiconductor manufacturing apparatus is desirably colored with black for example.

DISCLOSURE OF THE INVENTION

One object of the present invention is to provide low-thermal-expansion ceramics having wear resistance.

Another object of the present invention is to provide ceramics having a low-thermal-expansion property, rigidity and wear resistance.

A further object of the present invention is to provide ceramics having a low-thermal-expansion property, rigidity and wear resistance and further having electrical conductivity or being colored black or gray for example.

A still further object of the present invention is to provide ceramics having a low-thermal-expansion property, rigidity and wear resistance and further having electrical conductivity and being colored black.

A still further object of the present invention is to provide a member of an exposure apparatus that uses the ceramics as described above.

The inventors of the present invention have intensely studied for addressing the above-described problems to find ceramics that achieve the objects described above without deteriorating the low-thermal-expansion property of cordierite, spodumene and eucryptite. A ceramic achieving the above objects is produced by adding, to a predetermined amount of at least one selected from the group consisting of cordierite, spodumene and eucryptite, a predetermined amount of one material selected from the group consisting of carbides, nitrides, borides and silicides of group IVa elements, group Va elements and group VIa elements, and boron carbide, and sintering the resultant mixture. Alternatively, a ceramic is produced by adding, to a predetermined amount of at least one selected from the group consisting of cordierite, spodumene and eucryptite, a predetermined amount of carbon, and a predetermined amount of at least one selected from the group consisting of carbides, nitrides, borides and silicides of group IVa elements, group Va elements and group VIa elements, and silicon carbide, boron carbide and silicon nitride, and sintering the resultant mixture.

A low-thermal-expansion ceramic according to the present invention includes 60 vol % to 99.9 vol % of at least one selected from the group consisting of cordierite, spodumene and eucryptite, and 0.1 vol % to 40 vol % of at least one selected from the group consisting of carbides, nitrides, borides and silicides of group IVa elements, group Va elements and group VIa elements, and boron carbide. The ceramic has a porosity of 0.5% or less and a thermal expansion coefficient, at 10° C. to 40° C., of $1.5 \times 10^{-6}$/° C. or less.

Preferably, the content of at least one selected from the group consisting of carbides, nitrides, borides and silicides of group IVa elements, group Va elements and group VIa elements, and boron carbide is 2 vol % to 40 vol %.

Further, a low-thermal-expansion ceramic according to the present invention includes 57 vol % to 99.89 vol % of at least one selected from the group consisting of cordierite, spodumene and eucryptite, 0.01 vol % to 3.0 vol % of carbon, and 0.1 vol % to 40 vol % of at least one selected from the group consisting of carbides, nitrides, borides and silicides of group IVa elements, group Va elements and group VIa elements, and silicon carbide, boron carbide and silicon nitride. The ceramic has a porosity of 0.5% or less and a thermal expansion coefficient, at 10° C. to 40° C., of $1.5 \times 10^{-6}$/° C. or less.

Preferably, the low-thermal-expansion ceramic has a thermal expansion coefficient, at 10° C. to 40° C., of $1.0 \times 10^{-6}$/° C. or less. Still preferably, the low-thermal-expansion ceramic has a volume resistivity value of $10^8$ Ω·cm or less. Further, the low-thermal-expansion ceramic preferably has a Young's modulus of at least 130 GPa.

Moreover, the present invention is a member of an exposure apparatus at least partially formed of the low-thermal-expansion ceramic as described above.

BRIEF DESCRIPTION OF THE DRAWINGS

These and other aspects of the present invention will become apparent from the following detailed description of the invention, when considered in conjunction with accompanying drawings.

BEST MODES FOR CARRYING OUT THE INVENTION

Figure 1:
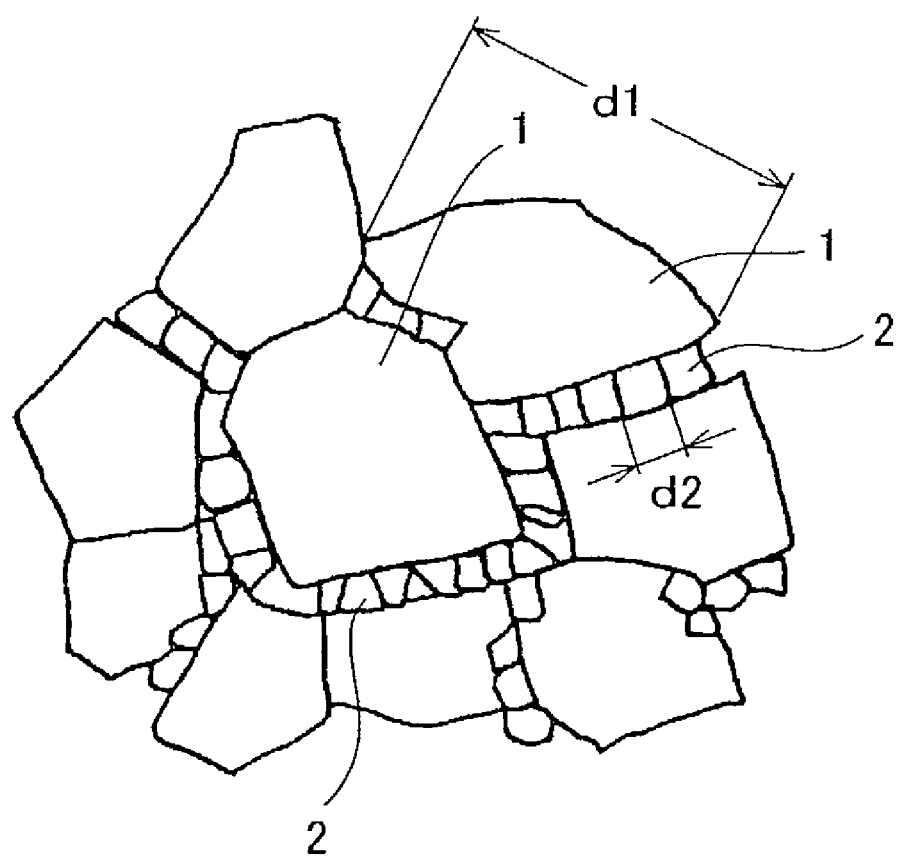
FIG. 1 schematically shows an exemplary sintered structure of a ceramic according to the present invention.

According to the present invention, in order to achieve a rigid, dense and low-thermal-expansion ceramic material, cordierite, spodumene, eucryptite, or a combination thereof is used as a main material (hereinafter referred to as component (a)) of the ceramic material. Aluminum titanate known as a low-thermal-expansion material is difficult to densify. Even if aluminum titanate is successfully densified, the low rigidity thereof hinders practical use of the aluminum titanate. Although spodumene as described above, has relatively low rigidity, a highly rigid ceramic material can be produced by adding any rigid material to spodumene and sintering the mixture.

A low-thermal-expansion ceramic according to the present invention has a content of cordierite, spodumene, eucryptite, or a combination thereof that is in the range from 60 vol % to 99.9 vol %. The content lower than 60 vol % results in a higher thermal expansion coefficient of the ceramic.

According to the present invention, the spodumene includes α-spodumene and β-spodumene, and the eucryptite includes α-eucryptite and β-eucryptite.

According to the present invention, at least one selected from the group consisting of carbides, nitrides, borides and silicides of group IVa elements, group Va elements and group VIa elements, and boron carbide ($B_4C$) is used as an additive material (hereinafter component (b1)). These additive materials are all highly hard and rigid and thus provide the ceramic composite with wear resistance and high rigidity. Most of the additive materials are electrically conductive. Then, any of the electrically conductive additive materials may be selected to provide the low-thermal-expansion ceramic with the electrical conductivity. In addition, most of the additive materials can color the low-thermal-expansion ceramic with black or gray. Thus, the present invention provides the low-thermal-expansion ceramic further excellent in terms of visibility and soil resistance.

The group IVa elements, group Va elements and group VIa elements are components of carbides, nitrides, borides and silicides included in the additive materials. Group IVa elements include, for example, titanium (Ti), zirconium (Zr) and hafnium (Hf), group Va elements include, for example, vanadium (V), niobium (Nb) and tantalum (Ta), and group VIa elements include, for example, chromium (Cr), molybdenum (Mo) and tungsten (W). Preferred additive materials are specifically tungsten carbide, titanium carbide, tantalum carbide, zirconium nitride, tantalum nitride, titanium boride, zirconium boride, tantalum silicide and molybdenum silicide for example. In particular, tungsten carbide, as one of these additive materials, is preferred because of its high hardness and high rigidity as well as low-thermal-expansion and electrical conductivity and because of its black color.

According to the present invention, the content of the additive material (component (b1)) in the low-thermal-expansion ceramic is in the range from 0.1 vol % to 40 vol %. If the content is lower than 0.1 vol %, the additive material does not impart sufficient rigidity and wear resistance to the ceramic. In order to further improve the rigidity and wear resistance imparted by the additive material, the content of the additive material is preferably at least 2 vol %.

In order to further impart the electrical conductivity to the low-thermal-expansion ceramic of the present invention, preferably any electrically conductive additive material is selected to be added with the content thereof in the range of 5 vol % to 40 vol %. The content of the additive material that is at least 5 vol % provides the low-thermal-expansion ceramic with a desirable electrical conductivity. An appropriate amount of the electrical conductor allows the low-thermal-expansion ceramic to have a volume resistivity value of $10^8$ Ω·cm or less.

The contents of the components of the low-thermal-expansion ceramic according to the present invention are represented by the percentage by volume (vol %) which is determined through secondary ion mass spectrometry (SIMS), atomic absorption spectrometry or ICP (inductively coupled plasma) spectrometry for example. Specifically, the volume percentage is obtained by first determining the percentage by mass of a component and then dividing the mass percentage by a general specific gravity of the component.

According to the present invention, carbon (component (c)) is added to easily impart a low resistivity to the sintered body. Moreover, carbon is added to reduce the amount of other additive materials. When the carbon is added, the content of cordierite, spodumene, eucryptite, or a combination thereof is in the range from 57 vol % to 99.89 vol %. If the content is lower than 57 vol %, the resultant ceramic has a higher thermal expansion coefficient.

The main material of the present invention, i.e., cordierite, spodumene, eucryptite, or a combination thereof is a highly resistive material having a volume resistivity of at least $10^{14}$ $\Omega \cdot cm$. The carbon used as one additive material can decrease the resistivity of the sintered body. According to the present invention, low resistivity refers to the resistivity represented by the volume resistivity of $10^8$ $\Omega \cdot cm$ or lower. This reference level of $10^8$ $\Omega \cdot cm$ corresponds to a critical resistance value for removing static electricity on a surface of a product. The ceramic of the present invention having the resistivity of this level or lower is thus characterized in that static electricity can speedily be removed. The volume resistivity of the ceramics according to the present invention is in the range from 10 $\Omega \cdot cm$ to $10^8$ $\Omega \cdot cm$ for example.

Moreover, the added carbon can also color the ceramic black. Any method is used for adding the carbon. Specifically, prior to a molding process, a carbon powder or a resin containing carbon which would remain after sintering is added to the main component, and then the resultant product is sintered in an inactive or non-oxidizing atmosphere for preventing emission of carbon. Alternatively, a molded product is sintered in a reducing atmosphere containing carbon to allow the carbon in the atmosphere to impregnate the product. The amount of remaining carbon is measured by means of conductimetry or infrared absorption to determine the amount of a carbonic acid gas generated from heating of the sample. The content of carbon in the ceramic is in the range of 0.01 to 3.0 vol %. If the carbon content is lower than 0.01 vol %, the low resistivity cannot be achieved and the ceramic cannot be colored black. If the carbon content is higher than 3.0 vol %, the sintered body is difficult to densify, resulting in increase in the porosity and deterioration of the rigidity.

According to the present invention, when carbon is added to the main component, an additive material (component (b2)) is any of carbides, nitrides, borides and silicides of group IVa elements, group Va elements and group VIa elements, and silicon carbide (SiC), boron carbide ($B_4C$) and silicon nitride (SiN). These materials are all highly hard and rigid and accordingly provide a product with wear resistance and high rigidity when added.

As described above, the group IVa elements, group Va elements and group VIa elements are components of carbides, nitrides, borides and silicides included in the additive materials. Group IVa elements include, for example, titanium (Ti), zirconium (Zr) and hafnium (Hf), group Va elements include, for example, vanadium (V), niobium (Nb) and tantalum (Ta), and group VIa elements include, for example, chromium (Cr), molybdenum (Mo) and tungsten (W). Preferred additive materials are specifically tungsten carbide, titanium carbide, tantalum carbide, zirconium nitride, tantalum nitride, titanium bonide, zirconium boride, tantalum silicide, molybdenum silicide, silicon nitride, silicon carbide, and boron carbide for example. In particular, tungsten carbide, silicon nitride, silicon carbide and boron carbide are preferred since they have high hardness and high rigidity as well as a low-thermal-expansion property and accordingly allow the above-described problems to be solved without deterioration in the low-thermal-expansion property of resultant products.

When carbon is added, the content of component (b2) in the ceramic is in the range from 0.1 vol % to 40 vol %. If the content is lower than 0.1 vol %, the ceramic exhibits insufficient rigidity and wear resistance. In order to further improve the rigidity and wear resistance, the component with the content of at least 1 vol % is preferably added. On the other hand, if the content exceeds 40 vol %, a satisfactory low-thermal-expansion property of the ceramic cannot be achieved.

According to the present invention, the porosity of the low-thermal-expansion ceramic is 0.5% or less, preferably 0.2% or less, and more preferably 0.1% or less. The range of the porosity may be from 0.001 to 0.5%, and the range from 0.001 to 0.2% is preferred. If the porosity exceeds 0.5%, the ceramic cannot satisfy required rigidity and strength.

According to the present invention, the thermal expansion coefficient, at 10° C. to 40° C., of the low-thermal-expansion ceramic is $1.5 \times 10^{-6}$/° C. or less, and preferably $1.0 \times 10^{-6}$/° C. or less. A ceramic having its thermal expansion coefficient higher than $1.5 \times 10^{-6}$/° C. is not appropriate for applications where the high precision is required as discussed above. The range of the thermal expansion coefficient may be from $-0.3 \times 10^{-6}$/° C. to $1.5 \times 10^{-6}$/° C., preferably from $-0.3 \times 10^{-6}$/° C. to $1.0 \times 10^{-6}$/° C., and in particular, the range from $-0.3 \times 10^{-6}$/° C. to $0.5 \times 10^{-6}$/° C. is preferred.

The ceramic of the present invention has the rigidity represented by Young's modulus of at least 70 GPa which is preferably at least 130 GPa. In general, required rigidity is achieved with any low Young's modulus by thickening a member to be used. However, the modulus lower than 70 GPa is inappropriate since such low rigidity causes any trouble in use of a ceramic member. According to the present invention, the ceramic material has a Young's modulus ranging from 70 to 320 GPa for example, and preferably ranging from 130 to 320 GPa.

The low-thermal-expansion ceramic according to the present invention may or may not include a rare earth element.

FIG. 1 schematically shows an exemplary sintered structure of a low-thermal-expansion ceramic according to the present invention. The sintered structure shown in FIG. 1 includes crystal grains 1 of cordierite, spodumene or eucryptite and crystal grains 2 of additive materials discussed above, and the average grain size or diameter of crystal grains 1 is greater than that of crystal grains 2. In the sintered structure shown in FIG. 1, crystal grains 2 are arranged to partially surround crystal grains 1. According to the present invention, crystal grains 1 formed of cordierite, spodumene or eucryptite may have an average grain size of 1 to 20 μm for example. If electrically conductive additive materials are used, the average grain size of crystal grains 1 is preferably 3 to 20 μm. The average grain size of crystal grains 2 formed of additive materials as discussed above may be 0.1 to 3 μm for example. If crystal grains 2 are formed of electrically conductive additive materials, the average grain size of crystal grains 2 is preferably 0.1 to 0.5 μm. In addition, the ratio of average grain size d1 of crystal grains 1 to average grain size d2 of crystal grains 2, i.e., d1/d2, is preferably 0.3 to 200 for example. If crystal grains 2 are electrically conductive, the ratio is preferably 6 to 200, and more preferably 15 to 200. If electrically conductive crystal grains 2 are used and successively connected to constitute at least a part of the sintered body as shown in FIG. 1, the sintered body exhibits conductivity. The structure as shown in FIG. 1 together with a higher ratio d1/d2 ensures the electrical conductivity of the sintered body even if the amount of conductive materials to be added is reduced. In this case, increase of the thermal expansion coefficient can be minimized.

The above-described low-thermal-expansion ceramic according to the present invention is produced preferably from a main material (component (a)) which is at least one of cordierite, spodumene and eucryptite powders having an average grain size of 10 μm or less (e.g. average grain size: 1–3 μm), and an additive material (component (b1) or (b2)) having an average grain size of 1 μm or less (e.g. average grain size: 0.1–1 μm)). The average grain size of powder of the additive material is preferably smaller than that of the main material. If the additive material is conductive, even a small amount of the additive material ensures conductivity. Here, increase of the thermal expansion coefficient due to the additive material can be minimized. For example, a tungsten carbide powder having an average grain size of 0.2 μm is commercially available which is effectively applied to the present invention. Any commercially available material may be ground into grains having a preferable average grain size, or any material having an appropriate average grain size may be prepared by a commonly used method such as classification.

A carbon powder having an average grain size of 0.1 μm or less as component (c) or instead of directly adding the carbon powder, any resin with its carbon left after being sintered, for example, phenol resin or furan resin may be added before a molding process. In this case, the resin component is melted in alcohol or water which is used when the resin component is added, so that the carbon can uniformly be dispersed through a resultant molded product.

A powder of a main material and a powder of an additive material at an appropriate ratio therebetween are mixed and the mixture together with a solvent of alcohol or water is ball-milled. The resultant mixture is then dried to produce a material powder. The material powder is sintered by hot pressing under predetermined conditions to produce a dense sintered body. Sintering conditions are as follows. If cordierite is used as the main material, sintering is performed in an inactive atmosphere of nitrogen or argon for example at a temperature of 1300° C. to 1450° C. under a pressure of 4.9 to 49 MPa. If spodumene is used as the main material, sintering is performed in an inactive atmosphere of nitrogen or argon for example at a temperature of 1200° C. to 1350° C. under a pressure of 4.9 to 49 MPa. If eucryptite is used as the main material, sintering is performed at a temperature of 1150° C. to 1300° C. under a pressure of 4.9 to 49 MPa. The produced sintered body can be machined into a desired shape of a product through grinding and polishing for example.

It is noted that any sintering method other than the hot pressing may be used. In particular, for mass production of large-sized products, normal sintering or hot isostatic pressing (HIP) may be used.

Figure 2A:
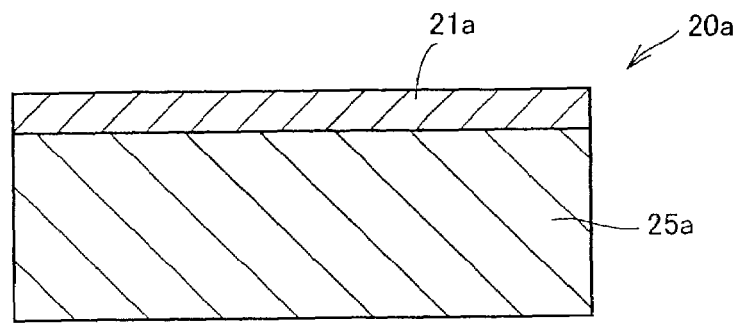
FIGS. 2A–2C are schematic cross sections each showing a structure of a product which is partially formed of the ceramic according to the present invention.
Figure 2B:
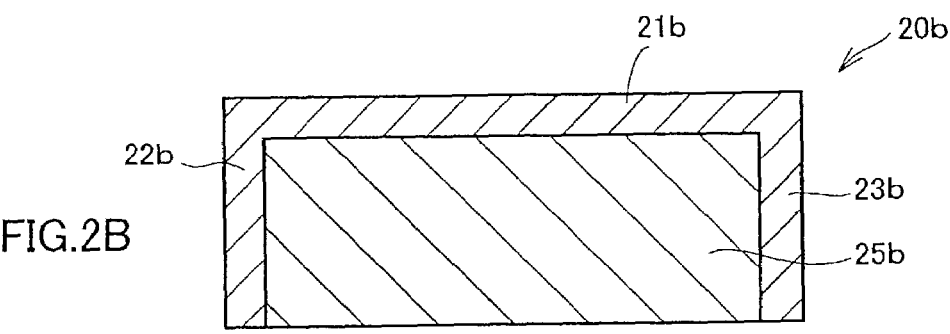
Figure 2C:
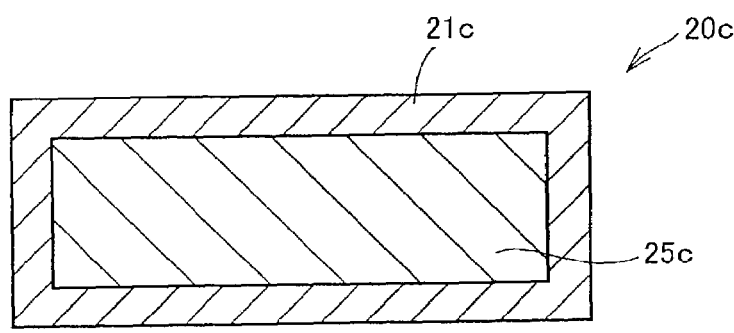

The ceramic according to the present invention is applicable to uses where low thermal expansion, low resistivity (high conductivity), rigidity and wear resistance are required. The ceramic of the present invention can thus be used to provide various types of products. Such products may be composed partially of the ceramic of the present invention or composed entirely of the ceramic of the present invention. If a product is partially composed of the ceramic of the present invention, an operational part of the product that requires low thermal expansion, low resistivity, rigidity and wear resistance has its surface preferably formed of the ceramic of the present invention. Examples of such a product are shown in FIGS. 2A–2C. A product 20a shown in FIG. 2A has one surface portion 21a formed of the ceramic of the present invention and another portion 25a formed of another material. A product 20b shown in FIG. 2B has three surface portions 21b, 22b and 23b formed of the ceramic of the present invention and another portion 25b formed of another material. A product 20c shown in FIG. 2C has a surface portion 21c covering the entire body of the product that is formed of the ceramic of the present invention and another part 25c is formed of another material. If a product is applied to a specific use where a lower thermal expansion property is required, a part of the product that should be highly rigid and wear-resistant may be formed of the ceramic of the present invention while other parts may be formed, for example, of cordierite, spodumene, or eucryptite, preferably be formed of cordierite only. Specifically, in the products shown in FIGS. 2A–2C, other parts 25a, 25b and 25c may be formed of cordierite, spodumene or eucryptite, and preferably be formed of cordierite only. The average coefficient of thermal expansion of the products thus approaches that of cordierite, spodumene or eucryptite and accordingly the low-thermal-expansion property is ensured while other characteristics such as wear resistance of any part requiring it can be satisfied. In this case, the ceramic of the present invention that constitutes a predetermined portion is preferably 20 μm to 5 mm in thickness. In other words, the surface portion as described above is preferably 20 μm to 5 mm in thickness.

Figure 3:
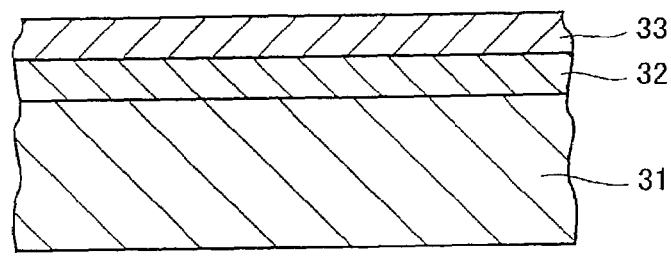
FIG. 3 is a schematic cross section showing a structure of another product which is partially formed of the ceramic according to the present invention.

If a product is formed of a combination of the ceramic of the present invention and another material (preferably cordierite, spodumene or eucryptite) and accordingly applied to a specific use, distortion could occur in the product due to a difference in the thermal expansion coefficient between a surface layer and a body. Then, an intermediate layer may be provided between the surface layer and the body. FIG. 3 shows an exemplary structure including the intermediate layer. The structure is shown to include an intermediate layer 32 being in contact with a body 31 and a surface portion 33 made of the ceramic of the present invention is provided on intermediate layer 32. Intermediate layer 32 preferably has a thermal expansion coefficient between that of body 31 and that of surface portion 33. A component of intermediate layer 32 that is made of the same material as that of body 31 (this material is hereinafter referred to as "body material") may be higher in content than that in surface portion 33. Intermediate layer 32 may have a transitional composition, i.e., a region of intermediate layer 32 closer to body 31 has a higher content of the body material while a region of intermediate layer 32 closer to surface portion 33 has a similar composition to that of surface portion 33. For example, suppose that body 31 is made of cordierite, spodumene or eucryptite. Then, although intermediate layer 32 contains the same additive material as that of surface portion 33, the concentration (content) of cordierite, spodumene or eucryptite in intermediate layer 32 is higher than that in surface portion 33. Alternatively, intermediate layer 32 may have a transitional composition, i.e., intermediate layer 32 contains the same additive material as that of the surface portion as well as cordierite, spodumene or eucryptite, with the concentration of the additive material gradually or successively decreasing and the concentration of cordierite, spodumene or eucryptite gradually or successively increasing as a region of intermediate layer 32 approaches body 31. The thickness of the intermediate layer may be 20 μm to 10 mm for example, and preferably 20 μm to 5 mm.

The product as described above that is partially constituted of the ceramic of the present invention may be fabricated by, for example, performing hot-pressing first on a material powder provided in a mold to tentatively form the powder, and then providing a different material in the mold on which hot-pressing is performed. Alternatively, multi-stage pressing may be performed to fabricate a product constituted of an outer surface and an inner portion that are respectively made of different materials, or mold pressing may be performed to obtain a similar product.

The low-thermal-expansion ceramic of the present invention is particularly suitable as a material of a component of an exposure apparatus. According to the present invention, a member of the exposure apparatus that is formed at least partially of the low-thermal-expansion ceramic is provided. For example, a part of or the whole of a vacuum chuck, stage member or block member for example may be constituted of the ceramic according to the present invention.

For the vacuum chuck, at least a surface portion of the vacuum chuck that forms a pin (the portion contacting a wafer) may be formed of the ceramic of the present invention. A disk-shaped vacuum chuck may entirely be formed of the ceramic of the present invention. If a part of the vacuum chuck is formed of the ceramic of the present invention, another part may be formed of such a material as described above, which is preferably cordierite, spodumene or eucryptite. The ceramic of the present invention imparts, to an operational surface of this vacuum chuck, a low-thermal-expansion property, high rigidity, low resistivity and wear resistance. The low resistivity (high conductivity) allows the operational surface to be protected from particles attached to the surface. Moreover, the ceramic of the present invention exhibits black or gray which allows the vacuum chuck to be excellent in terms of visibility and soil resistance.

According to the present invention, the porosity of the ceramic forming the vacuum chuck is preferably 0.1% or less. The maximum pore diameter of the ceramic is preferably 5 μm or less, and more preferably 2 μm or less. The pore diameter can be decreased to reduce the amount of particles which could attach to pores and thus maintain a high exposure accuracy.

For uses where higher wear resistance is required, the surface of the ceramic of the present invention may be covered with a layer formed of at least one ceramic material selected from the group consisting of carbides, nitrides and carbonitrides of a metal included in group IIIa elements, group IVa elements, group Va elements, group VIa elements and metalloids in the periodic table. For example, the ceramic material is at least one of carbides, nitrides and carbonitrides of Al, Si, Ti, Zr, V, Cr, Mo and W for example and combinations thereof. More specifically, the ceramic materials are TiC, TiN, SiC, $Si_3N_4$, CrN and TiAlN for example. In particular, the covering layer made of TiC, TiN, TiAlN or SiC exhibits conductivity and has a Vickers hardness of at least 1000 and a superior wear resistance. The thickness of the wear-resistant covering layer may be 1 to 40 μm for example. The wear-resistant covering layer may be formed by any of commonly used PVD and CVD.

EXAMPLES

Ceramic containing a main material (component (a)) and an additive material (component (b1)):

A powder of cordierite, β-spodumene or β-eucryptite having a purity of at least 99% and an average grain size of 3 μm was mixed with a powder having an average grain size of 0.5 μm of any of carbides, nitrides, borides and silicides of group IVa elements, group Va elements and group VIa elements and boron carbide ($B_4C$) in any of the proportions as shown in Tables 1–5, and then the powders were mixed by means of a ball mill with an ethanol solvent for 24 hours. The resultant mixture was dried and then hot-pressed at any of the temperatures shown in Tables 1–5 in an inactive atmosphere of nitrogen under 49 MPa (500 kgf/cm$^2$), and accordingly a dense sintered body having a porosity of 0.1% or less was produced. The sintered body was examined in terms of its physical properties as shown in Tables 1–5.

With reference to Tables 1–5, the wear resistance was measured by pin-on-disk method. The measured wear resistance was evaluated as follows. The amount of wear of the main material and that of the resultant sintered body were compared. The wear amount of the sintered body smaller than the wear amount of the main material by less than 1.5% was rated as x, that by 1.5% to 4.0% was rated as ○, and that by more than 4% was rated as ⊙.

Regarding the conductivity, a volume resistivity exceeding $10^8$ Ω·cm was rated as x and a volume resistivity smaller than $10^8$ Ω·cm was rated as ○.

Regarding the overall rating, a product having a thermal expansion coefficient exceeding $1.5 \times 10^{-6}$/° C. or receiving a low rating (x) for the wear resistance was rated as x as a comparative example.

From the results shown in Tables 1–5, it is seen that ceramics are each produced by adding, to 60 to 98 vol % of at least one of cordierite, spodumene and eucryptite, 0.1 to 40 vol % of at least one of carbides, nitrides, borides and silicides of group IVa elements, group Va elements and group VIa elements, and boron carbide, and then sintering and densifying this mixture, and the ceramics exhibit improved wear resistance and preferable rigidity without deteriorating the low-thermal-expansion property of cordierite, spodumene and eucryptite. It is also seen that the wear resistance can remarkably be improved by adding at least 2 vol % of any additive material.

Moreover, the results in Tables 1–5 show that the compositions of the present invention can impart conductivity to the low-thermal-expansion ceramics and color the ceramics with black or gray.

Further, it has been found that, if normal sintering or HIP is selected for mass production, resultant sintered bodies exhibit similar characteristics.

TABLE 1

| | composition | | | | | thermal | | | | | |
| | main material (vol %) | | | additive material | | sintering | expansion | | Young's | | | |
| No. | β-cordierite | β-spodumene | β-eucryptite | material | (vol %) content | temp (° C.) | coefficient ($\times 10^{-6}$/° C.) | color* | modulus (GPa) | wear resistance | conductivity | overall rating |
|---|---|---|---|---|---|---|---|---|---|---|---|---|
| 1 | 98 | | | WC | 2 | 1300 | 0.1 | black | 148 | ⊙ | X | ○ |
| 2 | 95 | | | WC | 5 | 1320 | 0.2 | black | 161 | ⊙ | ○ | ○ |
| 3 | 80 | | | WC | 20 | 1350 | 0.7 | black | 222 | ⊙ | ○ | ○ |

TABLE 1-continued

| | composition | | | | | thermal | | | | | |
|---|---|---|---|---|---|---|---|---|---|---|---|
| | main material (vol %) | | additive material | | sintering | expansion | | Young's | | | |
| | β- | β- | (vol %) | | temp | coefficient | | modulus | wear | | overall |
| No. | cordierite | spodumene | eucryptite | material | content | (° C.) | (×10⁻⁶/° C.) | color* | (GPa) | resistance | conductivity | rating |
| 4 | 60 | | | WC | 40 | 1400 | 1.4 | black | 304 | ◎ | ○ | ○ |
| 5 | | 98 | | WC | 2 | 1200 | −0.1 | black | 80 | ◎ | X | ○ |
| 6 | | 95 | | WC | 5 | 1220 | 0 | black | 94 | ◎ | ○ | ○ |
| 7 | | 80 | | WC | 20 | 1250 | 0.5 | black | 166 | ◎ | ○ | ○ |
| 8 | | 60 | | WC | 40 | 1300 | 1.3 | black | 262 | ◎ | ○ | ○ |
| 9 | 98 | | | TiC | 2 | 1310 | 0.2 | black | 145 | ◎ | X | ○ |
| 10 | 95 | | | TiC | 5 | 1330 | 0.4 | black | 153 | ◎ | ○ | ○ |
| 11 | 80 | | | TiC | 20 | 1360 | 1.5 | black | 192 | ◎ | ○ | ○ |
| 12 | 60 | | | TiC | 40 | 1410 | 2.8 | black | 244 | ◎ | ○ | X |
| 13 | 95 | | | B₄C | 5 | 1330 | 0.1 | black | 151 | ◎ | X | ○ |
| 14 | 80 | | | B₄C | 20 | 1360 | 0.8 | black | 182 | ◎ | X | ○ |
| 15 | 95 | | | TaC | 5 | 1330 | 0.3 | black | 152 | ◎ | ○ | ○ |
| 16 | 80 | | | TaC | 20 | 1360 | 1.2 | black | 188 | ◎ | ○ | ○ |
| 17 | 100 | | | | | 1300 | 0 | l. gray | 140 | X | X | X |
| 18 | | 100 | | | | 1200 | −0.2 | l. gray | 70 | X | X | X |
| 19 | 98.5 | | | WC | 1.5 | 1300 | 0 | l. gray | 146 | ○ | X | ○ |
| 20 | 55 | | | WC | 45 | 1420 | 1.6 | black | 325 | ◎ | ○ | X |
| 21 | | 98.5 | | WC | 1.5 | 1200 | −0.1 | l. gray | 77 | ○ | X | ○ |
| 22 | | 55 | | WC | 45 | 1300 | 1.6 | black | 286 | ◎ | ○ | X |

*l. gray: light gray

TABLE 2

| | composition | | | | | thermal | | | | | |
|---|---|---|---|---|---|---|---|---|---|---|---|
| | main material (vol %) | | additive material | | sintering | expansion | | Young's | | | |
| | β- | β- | (vol %) | | temp | coefficient | | modulus | wear | | overall |
| No. | cordierite | spodumene | eucryptite | material | content | (° C.) | (×10⁻⁶/° C.) | color | (GPa) | resistance | conductivity | rating |
| 23 | | | 95 | WC | 5 | 1200 | 0 | black | 145 | ◎ | ○ | ○ |
| 24 | | | 80 | WC | 20 | 1200 | 0.5 | black | 180 | ◎ | ○ | ○ |
| 25 | | | 60 | WC | 40 | 1220 | 1.2 | black | 260 | ◎ | ○ | ○ |
| 26 | | | 95 | TiC | 5 | 1200 | 0.2 | black | 142 | ◎ | ○ | ○ |
| 27 | | | 80 | TiC | 20 | 1200 | 1.3 | black | 175 | ◎ | ○ | ○ |
| 28 | | | 60 | TiC | 40 | 1220 | 2.5 | black | 220 | ◎ | ○ | X |

TABLE 3

| | composition | | | | | thermal | | | | | |
|---|---|---|---|---|---|---|---|---|---|---|---|
| | main material (vol %) | | additive material | | sintering | expansion | | Young's | | | |
| | β- | β- | (vol %) | | temp | coefficient | | modulus | wear | | overall |
| No. | cordierite | spodumene | eucryptite | material | content | (° C.) | (×10⁻⁶/° C.) | color | (GPa) | resistance | conductivity | rating |
| 29 | 98 | | | ZrN | 2 | 1300 | 0.1 | black | 145 | ◎ | X | ○ |
| 30 | 95 | | | ZrN | 5 | 1320 | 0.4 | black | 152 | ◎ | ○ | ○ |
| 31 | 80 | | | ZrN | 20 | 1350 | 1.3 | black | 188 | ◎ | ○ | ○ |
| 32 | 60 | | | ZrN | 40 | 1400 | 2.5 | black | 236 | ◎ | ○ | X |
| 33 | | 98 | | ZrN | 2 | 1220 | −0.1 | black | 76 | ◎ | X | ○ |
| 34 | | 95 | | ZrN | 5 | 1240 | 0.2 | black | 86 | ◎ | ○ | ○ |
| 35 | | 80 | | ZrN | 20 | 1270 | 1.2 | black | 132 | ◎ | ○ | ○ |
| 36 | | 60 | | ZrN | 40 | 1320 | 2.7 | black | 194 | ◎ | ○ | X |
| 37 | 98 | | | TaN | 2 | 1300 | 0.1 | black | 149 | ◎ | X | ○ |
| 38 | 95 | | | TaN | 5 | 1320 | 0.2 | black | 162 | ◎ | ○ | ○ |
| 39 | 80 | | | TaN | 20 | 1350 | 0.7 | black | 228 | ◎ | ○ | ○ |
| 40 | 60 | | | TaN | 40 | 1400 | 1.3 | black | 316 | ◎ | ○ | ○ |
| 41 | 98.5 | | | ZrN | 1.5 | 1300 | 0.1 | black | 144 | ○ | X | ○ |
| 42 | 55 | | | ZrN | 45 | 1420 | 2.9 | black | 248 | ◎ | ○ | X |
| 43 | | 98.5 | | ZrN | 1.5 | 1210 | −0.1 | light gray | 75 | ○ | X | ○ |
| 44 | | 55 | | ZrN | 45 | 1300 | 2.9 | black | 210 | ◎ | ○ | X |

TABLE 3-continued

| | composition | | | | | thermal | | | | | |
|---|---|---|---|---|---|---|---|---|---|---|---|
| | main material (vol %) | | | additive material | | sintering | expansion | | Young's | | |
| | β- | β- | | (vol %) | | temp | coefficient | | modulus | wear | overall |
| No. | cordierite | spodumene | eucryptite | material | content | (° C.) | (×10$^{-6}$/° C.) | color | (GPa) | resistance conductivity | rating |
| 45 | 98.5 | | | TaN | 1.5 | 1300 | 0.1 | light gray | 147 | ○ X | ○ |
| 46 | 55 | | | TaN | 45 | 1420 | 1.6 | black | 338 | ◎ ○ | X |
| 47 | | | 95 | ZrN | 5 | 1200 | 0.2 | black | 141 | ◎ ○ | ○ |
| 48 | | | 80 | ZrN | 20 | 1200 | 1.2 | black | 165 | ◎ ○ | ○ |
| 49 | | | 60 | ZrN | 40 | 1220 | 2.2 | black | 210 | ◎ ○ | X |

TABLE 4

| | composition | | | | | thermal | | | | | |
|---|---|---|---|---|---|---|---|---|---|---|---|
| | main material (vol %) | | | additive material | | sintering | expansion | | Young's | | |
| | β- | β- | | (vol %) | | temp | coefficient | | modulus | wear | overall |
| No. | cordierite | spodumene | eucryptite | material | content | (° C.) | (×10$^{-6}$/° C.) | color | (GPa) | resistance conductivity | rating |
| 50 | 98 | | | TiB$_2$ | 2 | 1300 | 0.1 | black | 148 | ◎ X | ○ |
| 51 | 95 | | | TiB$_2$ | 5 | 1320 | 0.2 | black | 160 | ◎ ○ | ○ |
| 52 | 80 | | | TiB$_2$ | 20 | 1350 | 0.8 | black | 218 | ◎ ○ | ○ |
| 53 | 60 | | | TiB$_2$ | 40 | 1400 | 1.5 | black | 296 | ◎ ○ | ○ |
| 54 | | 98 | | ZrB$_2$ | 2 | 1220 | -0.1 | black | 76 | ◎ X | ○ |
| 55 | | 95 | | ZrB$_2$ | 5 | 1240 | 0.1 | black | 84 | ◎ ○ | ○ |
| 56 | | 80 | | ZrB$_2$ | 20 | 1270 | 1 | black | 126 | ◎ ○ | ○ |
| 57 | | 60 | | ZrB$_2$ | 40 | 1320 | 1.9 | black | 182 | ◎ ○ | X |
| 58 | 98.5 | | | TiB$_2$ | 1.5 | 1300 | 0.1 | light gray | 146 | ○ X | ○ |
| 59 | 55 | | | TiB$_2$ | 45 | 1400 | 1.8 | black | 316 | ◎ ○ | X |
| 60 | | 98.5 | | TiB$_2$ | 1.5 | 1220 | 0.1 | light gray | 77 | ○ X | ○ |
| 61 | | 55 | | TiB$_2$ | 45 | 1320 | 2 | black | 277 | ◎ ○ | X |
| 62 | 98.5 | | | ZrB$_2$ | 1.5 | 1300 | 0.1 | light gray | 143 | ○ X | ○ |
| 63 | | 55 | | ZrB$_2$ | 45 | 1400 | 2.4 | black | 235 | ◎ ○ | X |
| 64 | | | 95 | TiB$_2$ | 5 | 1200 | 0.1 | black | 145 | ◎ ○ | ○ |
| 65 | | | 80 | TiB$_2$ | 20 | 1200 | 0.7 | black | 183 | ◎ ○ | ○ |
| 66 | | | 60 | TiB$_2$ | 40 | 1220 | 1.4 | black | 260 | ◎ ○ | ○ |

TABLE 5

| | composition | | | | | thermal | | | | | |
|---|---|---|---|---|---|---|---|---|---|---|---|
| | main material (vol %) | | | additive material | | sintering | expansion | | Young's | | |
| | β- | β- | | (vol %) | | temp | coefficient | | modulus | wear | overall |
| No. | cordierite | spodumene | eucryptite | material | content | (° C.) | (×10$^{-6}$/° C.) | color* | (GPa) | resistance conductivity | rating |
| 67 | 98 | | | TaSi$_2$ | 2 | 1300 | 0.1 | black | 143 | ◎ X | ○ |
| 68 | 95 | | | TaSi$_2$ | 5 | 1320 | 0.2 | black | 148 | ◎ ○ | ○ |
| 69 | 80 | | | TaSi$_2$ | 20 | 1350 | 0.7 | black | 172 | ◎ ○ | ○ |
| 70 | 60 | | | TaSi$_2$ | 40 | 1400 | 1.5 | black | 204 | ◎ ○ | ○ |
| 71 | | 98 | | TaSi$_2$ | 2 | 1220 | -0.1 | black | 75 | ◎ X | ○ |
| 72 | | 95 | | TaSi$_2$ | 5 | 1240 | 0 | black | 82 | ◎ ○ | ○ |
| 73 | | 80 | | TaSi$_2$ | 20 | 1270 | 0.6 | black | 116 | ◎ ○ | ○ |
| 74 | | 60 | | TaSi$_2$ | 40 | 1320 | 1.5 | black | 162 | ◎ ○ | ○ |
| 75 | 98 | | | MoSi$_2$ | 2 | 1300 | 0.1 | black | 144 | ◎ X | ○ |
| 76 | 95 | | | MoSi$_2$ | 5 | 1320 | 0.3 | black | 151 | ◎ ○ | ○ |
| 77 | 80 | | | MoSi$_2$ | 20 | 1350 | 1.2 | black | 182 | ◎ ○ | ○ |
| 78 | 60 | | | MoSi$_2$ | 40 | 1400 | 2.2 | black | 224 | ◎ ○ | X |
| 79 | 98.5 | | | TaSi$_2$ | 1.5 | 1300 | 0.1 | l. gray | 142 | ○ X | ○ |
| 80 | 55 | | | TaSi$_2$ | 45 | 1410 | 1.7 | black | 212 | ◎ ○ | X |
| 81 | | 98.5 | | TaSi$_2$ | 1.5 | 1210 | -0.1 | l. gray | 73 | ○ X | ○ |
| 82 | | 55 | | TaSi$_2$ | 45 | 1330 | 1.6 | black | 174 | ◎ ○ | X |
| 83 | 98.5 | | | MoSi$_2$ | 1.5 | 1300 | 0.1 | l. gray | 143 | ○ X | ○ |
| 84 | 55 | | | MoSi$_2$ | 45 | 1410 | 2.3 | black | 235 | ◎ ○ | X |

TABLE 5-continued

| | composition | | | | | thermal | | | | | |
|---|---|---|---|---|---|---|---|---|---|---|---|
| | main material (vol %) | | | additive material | | sintering | expansion | | Young's | | |
| | | β- | β- | (vol %) | | temp | coefficient | | modulus | wear | overall |
| No. | cordierite | spodumene | eucryptite | material | content | (° C.) | (×10$^{-6}$/° C.) | color* | (GPa) | resistance | conductivity | rating |
| 85 | | | 95 | TaSi$_2$ | 5 | 1200 | 0 | black | 140 | ◎ | ○ | ○ |
| 86 | | | 80 | TaSi$_2$ | 20 | 1200 | 0.6 | black | 161 | ◎ | ○ | ○ |
| 87 | | | 60 | TaSi$_2$ | 40 | 1220 | 1.4 | black | 180 | ◎ | ○ | ○ |

*l. gray: light gray

B. Ceramic containing a main material (component (a)), an additive material (component (b2)) and carbon (component (c)):

A powder of cordierite, β-spodumene or β-eucryptite having a purity of at least 99% and an average grain size of 3 μm was mixed with a carbon powder having an average grain size of 0.1 μm and any of carbides, nitrides, borides and silicides of group IVa elements, group Va elements and group VIa elements and silicon carbide (SiC), boron carbide (B$_4$C) and silicon nitride (SiN) having an average grain size of 0.5 μm, so that the proportion of these components shown in Tables 6 and 7 was satisfied after sintering, and then the powders were mixed by means of a ball mill with an ethanol solvent for 24 hours. The resultant powder mixture was dried and then hot-pressed at any of the temperatures shown in Tables 6 and 7 in an inactive atmosphere of nitrogen or argon under 49 MPa (500 kgf/cm$^2$), and accordingly a dense sintered body having a porosity of 0.1% or less was produced. The sintered body was examined in terms of its physical properties as shown in Tables 6 and 7.

TABLE 6

| | composition | | | | | | | thermal | | | | | |
|---|---|---|---|---|---|---|---|---|---|---|---|---|---|
| | main material (vol %) | | | component | additive material (vol %) | | | sintering | expansion | | Young's | | conduc- | overall |
| | component (a) | | | (c) | component (b2) | | | temp | coefficient | | modulus | wear | | |
| No. | CO | SP | YU | carbon | material | content | | (° C.) | (×10$^{-6}$/° C.) | black | (GPa) | resistance | tivity | rating |
| 88 | 100 | | | 0 | none | 0 | | 1350 | 0.0 | X | 140 | X | X | X |
| 89 | | 100 | | 0 | none | 0 | | 1200 | −0.5 | X | 120 | X | X | X |
| 90 | 99.89 | | | 0.01 | WC | 0.1 | | 1300 | 0.0 | ○ | 140 | ○ | ○ | ◎ |
| 91 | 99.95 | | | 0.05 | WC | 0 | | 1300 | 0.0 | ○ | 140 | X | ○ | X |
| 92 | 80 | | | 2 | WC | 18 | | 1340 | 0.7 | ○ | 211 | ◎ | ○ | ◎ |
| 93 | 70 | | | 3 | WC | 27 | | 1340 | 1.0 | ○ | 247 | ◎ | ○ | ◎ |
| 94 | 55 | | | 2 | WC | 43 | | 1340 | 1.6 | ○ | 314 | ◎ | ○ | X |
| 95 | | 99.89 | | 0.01 | TiC | 0.1 | | 1300 | −0.1 | ○ | 70 | ○ | ○ | ◎ |
| 96 | | 83 | | 3 | TiC | 14 | | 1300 | 0.9 | ○ | 114 | ◎ | ○ | ◎ |
| 97 | | | 50 | 3 | TiC | 47 | | 1200 | 3.0 | ○ | 248 | ◎ | ○ | X |
| 98 | | | 99.89 | 0.01 | Si$_3$N$_4$ | 0.1 | | 1200 | −0.5 | ○ | 120 | ○ | ○ | ◎ |
| 99 | | | 57 | 3 | Si$_3$N$_4$ | 40 | | 1200 | 0.3 | ○ | 188 | ◎ | ○ | ◎ |
| 100 | 20 | | 79.89 | 0.01 | ZrN | 0.1 | | 1230 | −0.4 | ○ | 124 | ○ | ○ | ◎ |
| 101 | 20 | | 65 | 0.01 | ZrN | 14.99 | | 1230 | 0.8 | ○ | 163 | ◎ | ○ | ◎ |
| 102 | 20 | | 79.89 | 0.01 | TiB$_2$ | 0.1 | | 1230 | −0.4 | ○ | 124 | ○ | ○ | ◎ |
| 103 | 30 | | 40 | 3 | TiB$_2$ | 27 | | 1250 | 1.0 | ○ | 233 | ◎ | ○ | ◎ |
| 104 | 99.89 | | | 0.01 | B$_4$C | 0.1 | | 1350 | 0.0 | ○ | 140 | ○ | ○ | ◎ |
| 105 | | | 70 | 3 | B$_4$C | 27 | | 1200 | 0.9 | ○ | 179 | ◎ | ○ | ◎ |
| 106 | | | 70 | 0.001 | B$_4$C | 29.999 | | 1200 | 1.0 | X | 189 | ◎ | X | ○ |
| 107 | 99.89 | | | 0.01 | SiC | 0.1 | | 1350 | 0.0 | ○ | 140 | ○ | ○ | ◎ |
| 108 | | | 70 | 3 | SiC | 27 | | 1200 | 0.9 | ○ | 192 | ◎ | ○ | ◎ |
| 109 | 99.89 | | | 0.01 | TaSi$_2$ | 0.1 | | 1350 | 0.0 | ○ | 140 | ○ | ○ | ◎ |
| 110 | | | 65 | 3 | TaSi$_2$ | 32 | | 1200 | 1.0 | ○ | 174 | ◎ | ○ | ◎ |

CO: cordierite,
SP: β-spodumene,
YU: β-eucryptite

TABLE 7

| | composition | | | | | | | | | | | |
|---|---|---|---|---|---|---|---|---|---|---|---|---|
| | main material (vol %) component (a) | | | additive material (vol %) | | | sintering temp | thermal expansion coefficient | | Young's modulus | wear | conduc- | overall |
| | component (a) | | | component (c) | component (b2) | | | | | | | | |
| No. | CO | SP | YU | carbon | material | content | (° C.) | ($\times 10^{-6}$/° C.) | black | (GPa) | resistance | tivity | rating |
| 111 | 98 | | | 1.0 | $Si_3N_4$ | 1.0 | 1350 | 0.0 | ○ | 138 | ○ | ○ | ⊚ |
| 112 | 97.5 | | | 1.5 | $Si_3N_4$ | 1.0 | 1350 | 0.0 | ○ | 135 | ○ | ○ | ⊚ |
| 113 | 97.0 | | | 1.0 | $Si_3N_4$ | 2.0 | 1350 | 0.0 | ○ | 140 | ⊚ | ○ | ⊚ |
| 114 | 96.5 | | | 1.5 | $Si_3N_4$ | 2.0 | 1350 | 0.1 | ○ | 138 | ⊚ | ○ | ⊚ |

CO: cordierite,
SP: β-spodumene,
YU: β-eucryptite

With reference to Tables 6 and 7, the wear resistance was measured by pin-on-disk method. The measured wear resistance was evaluated as follows. The amount of wear of the main material and that of the resultant sintered body were compared. The wear amount of the sintered body smaller than the wear amount of the main material by less than 1.5% was rated as x, that by 1.5% to 4.0% was rated as ○, and that by more than 4% was rated as ⊚.

Regarding the conductivity, a volume resistivity exceeding $10^8$ Ω·cm was rated as x and a volume resistivity of $10^8$ Ω·cm or less was rated as ○. Regarding the color of black, a product which was successfully blackened was rated as ○ and a product which was not blackened was rated as x.

Regarding the overall rating, a product having a thermal expansion coefficient exceeding $1.5 \times 10^{-6}$/° C. or receiving a low rating (x) for the wear resistance was rated as x as a comparative example. Further, a product having a thermal expansion coefficient of $1.5 \times 10^{-6}$/° C. or less and receiving a high rating (○ or ⊚) for the wear resistance was rated as ○ according to the present invention. For the conductivity of the present invention, a volume resistivity of $10^8$ Ω·cm or less was rated as ⊚.

It is noted that the carbon content exceeding 3 vol % results in the porosity exceeding 0.5% of a sintered body which means that the sintered body cannot be densified.

From the results shown in Tables 6 and 7, it is seen that ceramics each contains 57 to 99.89 vol % of at least one of cordierite, spodumene and eucryptite, 0.01 to 3.0 vol % of carbon, and 0.1 to 40 vol % of at least one of carbides, nitrides, borides and silicides of group IVa elements, group Va elements and group VIa elements, and silicon carbide, boron carbide and silicon nitride, and the ceramics accordingly assume black and have improved resistivity, wear resistance and preferable rigidity, without deteriorating the low-thermal-expansion property of cordierite, spodumene or eucryptite.

INDUSTRIAL APPLICABILITY

As heretofore discussed, the present invention provides ceramics having a low-thermal-expansion property and assuming black or gray, and further having high rigidity and wear resistance and exhibiting conductivity as required. The low-thermal-expansion ceramics of the present invention are applicable to various types of uses where there are demands for low thermal expansion, high rigidity and wear resistance, and conductivity as required. In particular, the ceramics of the present invention are applicable to components of apparatuses for manufacturing semiconductors or liquid-crystals, such as a vacuum chuck and a stage member of an exposure apparatus.

Although the present invention has been described and illustrated in detail, it is to be clearly understood that this is done by way of illustration and example only and is not to be taken by way of limitation. The spirit and scope of the present invention are to be limited only by the terms of the appended claims.

The invention claimed is:

1. A low-thermal-expansion ceramic comprising:
   57 vol % to 99.89 vol % of at least one selected from the group consisting of cordierite and spodumene;
   0.01 vol % to 3.0 vol % of carbon; and
   0.1 vol % to 40 vol % of at least one selected from the group consisting of carbides, nitrides, borides and silicides of group IVa elements, group Va elements and group VIa elements, and silicon carbide, boron carbide and silicon nitride, wherein
   said ceramic has a porosity of 0.5% or less and a thermal expansion coefficient, at 10° C. to 40° C., of $1.5 \times 10^{-6}$/° C. or less.

2. A low-thermal-expansion ceramic comprising:
   60 vol % to 99.9 vol % of at least one selected from the group consisting of cordierite and spodumene;
   0.1 vol % to 40 vol % of at least one selected from the group consisting of carbides, nitrides, borides and silicides of group IVa elements, group Va elements and group VIa elements; and
   wherein said ceramic has a porosity of 0.5% or less and a thermal expansion coefficient, at 10° C. to 40° C., $1.0 \times 10^{-6}$/° C. or less.

3. The low-thermal-expansion ceramic according to claim 2, wherein the content of said at least one selected from the group consisting of carbides, nitrides, borides and silicides of group IVa elements, group Va elements and group VIa elements is 2 vol % to 40 vol %.

4. The low-thermal-expansion ceramic according to claim 2, wherein said ceramic has a volume resistivity of $10^8$ Ω·cm or less.

5. The low-thermal-expansion ceramic according to claim 4, wherein said ceramic has a Young's modulus of at least 130 GPa.

6. A member of an exposure apparatus at least partially formed of the low-thermal-expansion ceramic according to claim 2.

7. A member of an exposure apparatus at least partially formed of the low-thermal-expansion ceramic according to claim 1.

8. The low-thermal-expansion ceramic according to claim 2, wherein said ceramic has a Young's modulus of at least 130 GPa.

9. The low-thermal-expansion ceramic according to claim 1, wherein the thermal expansion coefficient at 10° C. to 40° C. is $1.0 \times 10^{-6}$/° C. or less.

10. The low-thermal-expansion ceramic according to claim 1, wherein said ceramic has a volume resistivity of $10^8$ Ω·cm or less.

11. The low-thermal-expansion ceramic according to claim 1, wherein said ceramic has a Young's modulus of at least 130 GPa.

* * * * *